United States Patent [19]

Reinartz

[11] Patent Number: 4,643,488
[45] Date of Patent: Feb. 17, 1987

[54] HYDRAULIC VEHICLE SERVO BRAKE

[75] Inventor: Hans-Dieter Reinartz, Frankfurt am Main, Fed. Rep. of Germany

[73] Assignee: Alfred Teves GmbH, Frankfurt am Main, Fed. Rep. of Germany

[21] Appl. No.: 744,499

[22] Filed: Jun. 13, 1985

[30] Foreign Application Priority Data

Jun. 14, 1984 [DE] Fed. Rep. of Germany ....... 3422152

[51] Int. Cl.$^4$ .......................... B60T 13/12; B60T 8/02
[52] U.S. Cl. ...................................... 303/114; 60/574; 60/591
[58] Field of Search ................. 303/114, 116, 119, 52, 303/10, 113, 100; 60/574, 575, 591, 553

[56] References Cited

U.S. PATENT DOCUMENTS 3,539,227 11/1970 Drutchas .............................. 303/114
3,827,242 11/1972 Belart ..................................... 303/52
4,482,192 11/1984 Leiber .................................. 303/100

FOREIGN PATENT DOCUMENTS 3338249 5/1985 Fed. Rep. of Germany .
2148432 10/1984 United Kingdom ................ 303/114

Primary Examiner—Duane A. Reger
Assistant Examiner—Alvin Oberley
Attorney, Agent, or Firm—James B. Raden; William J. Michals

[57] ABSTRACT

A hydraulic vehicle servo brake comprises a master cylinder (11) accommodating at least one stepped main-piston assembly (12). A booster piston (12') is provided which is acted upon by a controlled pressure with the controlled pressure being delivered by a brake valve (29) governed by the brake pedal. When the brake pedal (13) is not depressed, a valve contained in an annular chamber is opened and connects the annular chamber to the supply reservoir. In the event of slight advance movement of the main-piston assembly (12), the valve (20) will close. In this case, a wheel-slip brake control unit will shut off the annular chamber (19) hydraulically towards the outside. To accomplish a compact design, the booster piston (12') and the tapered main piston part (12") are united to form an integral piston (26) of constant diameter.

3 Claims, 1 Drawing Figure

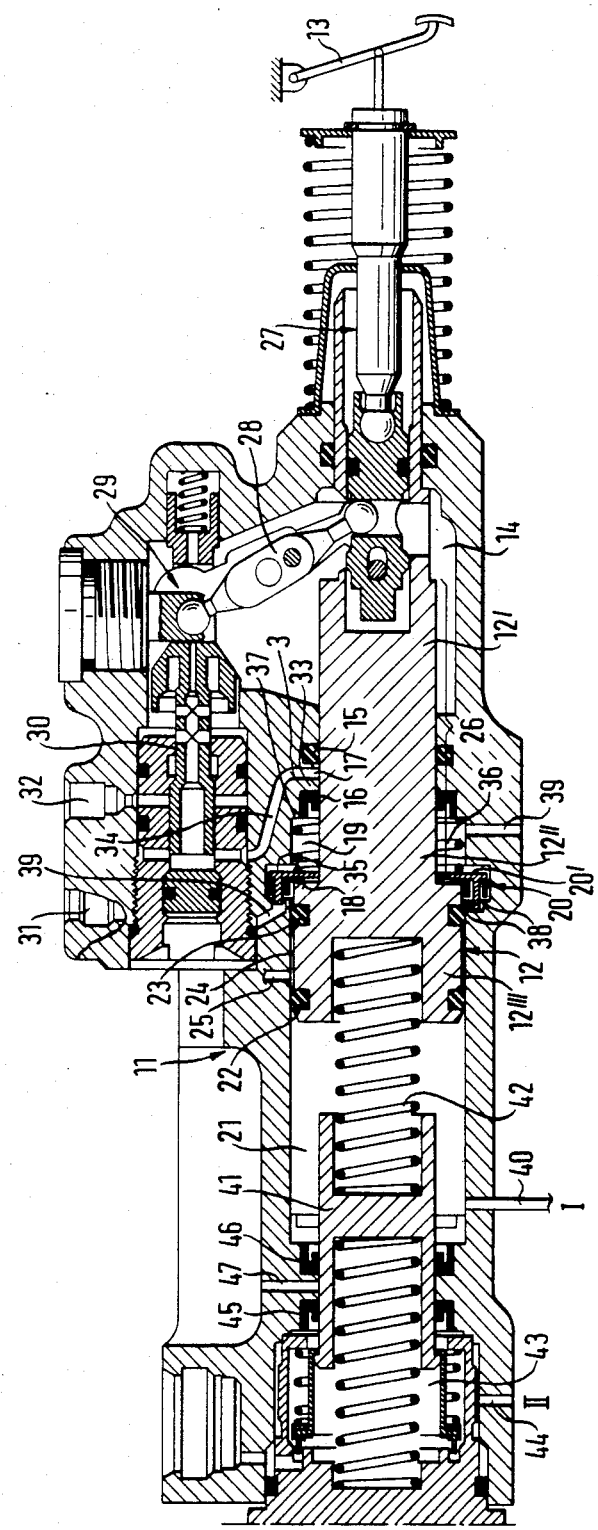

HYDRAULIC VEHICLE SERVO BRAKE

BACKGROUND OF THE INVENTION

The present invention relates to a hydraulic vehicle servo brake with a master cylinder comprising at least one stepped main-piston assembly, with an annular chamber provided at the annular step of the main piston, with a booster piston positively engaged with the main piston and being adapted to be acted upon by the brake pedal and by the controlled pressure that is supplied by a brake valve governed by the brake pedal. A first annular seal seals the booster piston in relation to the control pressure chamber, with a second annular seal sealing the main piston in relation to the annular chamber, as well as with a valve disposed in the annular chamber. When the brake pedal is not depressed, the valve disposed in the annular chamber is opened due to the main piston being in its inactive position and connects the annular chamber with the supply reservoir and which will close already in the event of a slight advance movement of the main piston. After closing of the valve, the annular chamber will be connected to the pressure chamber of the main piston and a wheel slip brake control unit will shut off the annular chamber as soon as wheel slip occurs. An annular gap closed by two annular seals and connected to the supply reservoir is arranged at the enlarged main piston part so that the annular chamber is connected to the supply reservoir port in the presence of a pedal travel which is still sufficient for performing a panic stop that is not boosted by auxiliary force. In this arrangement, the two annular seals are secured to the master cylinder.

In such prior art vehicle servo brakes (German printed and published patent application 33 38 249), the main piston and the booster piston are two different components, their facing end surfaces including coaxial recesses in which a tappet is arranged providing positive engagement between the two pistons.

The diameter of the booster piston is larger than the diameter of the tapered main piston part, to the end that, in consequence of a predefined controlled pressure in the control pressure chamber, approximately the same amount of pressure will be attained in the main piston pressure chamber. However, the enlarged main piston part is of somewhat larger diameter than the booster piston so that the pressure in the main piston pressure chamber is correspondingly somewhat less than the controlled pressure. This slight difference of surfaces between the enlarged main piston part and the booster piston is important for the reason that, when the controlled pressure is applied on the main-piston pressure chamber, a resultant resetting force is caused to act on the main-piston/booster-piston arrangement in the event of wheel slip, when the annular chamber is connected to the supply reservoir upon a too great advance movement of the main piston. This way, a reliable resetting of the main piston is accomplished until a position is reached at about 40% of the total pedal travel. Accordingly, consumption of pressure fluid which is considerable under certain circumstances upon the occurrence of wheel slip will not result in the main piston being advanced beyond the 40% pedal position. This is important in order to have available at any time sufficient pedal travel for a panic stop that may become necessary, for instance upon failure of the wheel slip brake control unit.

The annular chamber which encompasses the booster piston and the tapered main piston part in the area of their opposing end surfaces communicates with the supply reservoir by way of a supply-reservoir connecting bore, so that this chamber is always unpressurized. This is significant because, in the event of the first or the second annular seal becoming leaky, pressure fluid can discharge into the supply reservoir more or less unhindered, in consequence whereof the brake pedal will be depressed through its full travel, and malfunction of the brake will occur.

It is an object of the present invention to create a hydraulic vehicle servo brake of the type described which is of more compact design and which will function with a reduced volume consumption of the brake booster in order to reset the main piston in the event of beginning wheel slip.

SUMMARY OF THE INVENTION

This object is achieved by the present invention which provides that the booster piston and the tapered main piston part are united to form an integral piston of constant diameter. The first and second annular seal are provided at a small axial distance from one another and have the supply-reservoir connecting bore arranged between them. In this arrangement, the second annular seal suitably is adjacent to the annular chamber.

By uniting the main piston and the booster piston to form one single component, the overall length of the master cylinder can be reduced considerably. Although it is known to substitute the two annular seals of the known vehicle servo brake (German printed and published patent application 33 38 249) by one single annular seal, the present uses two such annular seals which, however, are placed at a very close axial distance from one another that allows between them accommodation of the supply bore branching off transversely to the axis. Despite the uniting of main piston and booster piston, this way there will be preserved the important progress in respect of safety that the brake pedal is depressed through its full travel upon failure of one of the two annular seals and thus disturbance of the brake is indicated to the driver.

It is of particular advantage if the diameter of the piston is equal to the diameter of the tapered main piston part. Inventively, the diameter of the booster piston united with the main piston is reduced, whereby the controlled pressure is correspondingly increased in order to generate the same amount of braking force. Thus, the controlled pressure is increased in relation to the pressure prevailing in the pressure chamber of the main piston. According to the present invention, the surfaces of the enlarged main piston part and of the piston are conformed such that, in the presence of specific accumulator pressure such as 105 bar, the pressure that is generated in the pressure chamber of the main piston as a result of the accumulator pressure allows complete braking of the loaded vehicle. In the presence of such a specific minimum accumulator pressure, for example 105 bar, generally an alarm light will flash at the dashboard of the vehicle and indicate a malfunction. However, as previously described, reliable braking of the loaded vehicle is still possible in this stage. For instance, in the presence of a minimum accumulator pressure of 105 bar, a pressure of 80 bar can still be generated in the pressure chamber of the main piston, which is sufficient for the full braking.

Designing the tapered main piston part and the booster piston as an integral piston with a continuously uniform diameter not only bears advantages in terms of function but also in terms of structure, because only a single piston is needed to manufacture instead of two pistons with a tapped disposed therebetween.

In another advantageous embodiment of this invention the surface of the enlarged main piston part is reduced corresponding to the decrease of surfaces of the booster piston and, respectively, the increase of the controlled pressure, what is enabled by the higher booster pressure which will be introduced into the pressure chamber of the main piston in the event of beginning wheel slip. This decrease in diameter and, respectively, surfaces of the enlarged main piston part has a result that less pressure fluid will be consumed in case resetting of the main piston may become necessary to attain the 40% pedal position.

Hence, with respect both its overall length and its diameter, the vehicle brake of the present invention is of more compact design that the prior art devices. While the invention provides short dimensions, the electric motor for the pump delivering the controlled pressure and charging the accumulator and the pump itself can be maintained at present efficiency and capacity levels, or even decreased under certain circumstances.

The reduction of the overall length which is provided by the present invention corresponds roughly to the total stroke occuring during braking. The surface of the enlarged main piston part is large enough as to ensure that, upon commencement of wheel slip, the brake pedal depressed by the driver's foot will be urged back to assume the 40% pedal position by a force of 100 kilopound (for example), if this position is surpassed due to increased pressure fluid consumption upon commencement of wheel slip.

BRIEF DESCRIPTION OF THE DRAWING

The present invention will be described hereinbelow in more detail with reference to the accompanying drawing in which the single FIGURE displays a partial cross-sectional side view of a vehicle brake in accordance with the present invention.

DETAILED DESCRIPTION

According to the drawing, a tandem master cylinder 11 accommodates a main-piston assembly 12 which is composed of an enlarged main piston part 12''', of a tapered main piston part 12'' succeeding thereto in the direction of the brake pedal 13 by way of an annular step 18, as well as of a subsequent booster piston 12' forming a construction unit with the letter part 12''. The booster piston 12' and the tapered main piston part 12'' form together a piston 26 of constant diameter.

The main-piston assembly 12 is acted upon by the brake pedal 13 by way of tappet elements 27. Besides, said tappet elements 27 transmit their axial movements by way of motion-transmitting elements 28 onto a brake valve 29 which, principally, is designed such and functions such as has been described in German printed and published patent application 33 38 249.

In general, the brake valve 29 functions such that, upon advance movement of the tappet elements 27 by way of the motion-transmitting elements elements 28, the central tappet 30 of the brake valve 29 will be entrained correspondingly, as a result whereof a port 31 leading to the supply reservoir or, alternatively, a port 32 leading to the pump and to the accumulator, respectively, will be connected to the control pressure chamber 14 in front of the main-piston assembly 12, so that there will be development of that controlled pressure in the control pressure chamber 14 which is required for the generation of an auxiliary force.

In the area of the annular step 18 between the tapered and the enlarged main piston part 12'' and 12''', respectively, there is arranged, offset axially in the direction of the brake pedal 13, a corresponding annular step 33 of the master cylinder 11, at the pedal-side end 3 of which step a second annular seal 16 is accommodated at a small axial distance from a first annular seal 15 which is disposed closer to the brake pedal 13. The said two annular seals 15, 16 are in sealing and sliding abutment on the circumferential wall of the piston 26. Between the annular seals 15, 16, there is just about as much space as to allow the accommodation of a supply-reservoir connecting bore 17 laterally branching off, which bore communicates through a hydraulic line 34 by way of the brake valve 29 with the port 31 leading to the supply reservoir.

In a chamber 35 which projects radially outwardly from the side of the annular chamber 19 remote from the pedal 13, there is placed an annularly designed valve 20, the valve body 20' of said being urged against an annular wall 38 by means of a helical spring 36 which encompasses the piston 26 and which takes support on a small annular step 37 in the area of the second annular seal 16, whereby a connecting channel 39 to the port 31 of the brake valve 29 communicating with the supply reservoir is hydraulically shut off. However, in the position to be seen from the drawing, the annular step 18 of the main-piston assembly 12 will lift the valve body 20' slightly from the annular wall 38 so that the valve is opened in the inactive position to be taken from the drawing and the annular chamber 19 is consequently in communication with the supply reservoir.

In the event of only slight advance movement of the main-piston assembly 12 upon actuation of the brake pedal 13, the valve 20 will close at once by the action of the helical spring 36, in consequence whereof the annular chamber 19 will be isolated from the supply reservoir. Simultaneously, the pressure supplied out of the pressure chamber 21 of the main-piston assembly 12 by way of a non-illustrated valve will be delivered through a radial bore 39 to the annular chamber 19 so that pressure balance takes place between the pressure chamber 21 and the annular chamber 19. The pressure is taken from the pressure chamber 21 through a lateral outlet bore 40 which communicates also with the brake circuit I of the vehicle.

Moreover, the tanden master cylinder 11 incorporates a second main piston 41 which is acted upon and advanced by the pressure in the pressure chamber 21. It is coupled to the main-piston assembly 12 by a resetting spring 42. The brake circuit II of the vehicle is connected to the pressure chamber 43 of the second main piston 41 by way of a lateral bore 44.

Two annular sleeves 45, 46 acting simultaneously as non-return valves seal the pressure chambers 21, 43 relative to one another. Between the said two annular sleeves 45, 46, there is a lateral connecting bore 47 which will be connected to the controlled pressure as soon as wheel slip occurs at one of the vehicle wheels. In this case, the annular sleeves 45, 46 designed as non-return valves allow the introduction of pressure fluid directly into the pressure chambers 21 and 43, respectively, and thus into the brake circuits I and II, respectively. In such an event, the controlled pressure will prevail in the pressure chamber 21 which acts on the surface of the main-piston assembly 12 that is remote from the brake pedal 13 and which thereby exerts a resetting force on the main-piston assembly 12 which prevents the brake pedal 13 from depressing through its full travel. Since, at the same moment, the annular chamber 19 will be shut off hydraulically towards the outside by one of the non-illustrated valves being changed over, the main-piston assembly 12 as a whole will be fixed in the position it assumes upon beginning wheel slip, that means, that the brake pedal 13 will neither be depressed through its full travel, nor will it be reset.

The enlarged main piston part 12''' is sealed towards the pressure chamber 21 and, respectively, the annular chamber 19 by two annular seals 22, 23 spaced axially from one another. Between these two annular seals 22, 23, there is an annular gap 24 towards the master cylinder 11, which gap is connected to the supply reservoir by way of a lateral supply-reservoir connecting bore 25.

The supply-reservoir connecting bore 25 is placed in an axial direction such that the annular seal 23 of the main-piston assembly 12 will override the connecting bore 25 in that instant when the pedal 13 has covered approximately 40% of the maximally possible pedal travel. In this instant, the annular chamber 19 will be connected to the supply reservoir by way of the connecting bore 25, as a result whereof the so far prevailing hydraulic isolation of the annular chamber 19 towards the outside will be eliminated, and the main-piston assembly 12 will be shifted back by the pressure prevailing in the pressure chamber 21 as far as until the annular step 18 again will be placed in front of the connecting bore 25 and the annular chamber 19 again will be shut off towards the outside thereby. That means, the main-piston assembly 12 will always be reset by the controlled pressure in the pressure chamber 21 so far as to have available a sufficient travel for a panic stop at any time.

Since the cross-section of the piston 26 is relatively small, likewise the cross-section of the enlarged main piston part 12''' can be decreased, if the controlled pressure prevailing in the pressure chamber 21 upon the commencement of wheel slip is correspondingly increased slightly.

Principally, the advantage of the compact design of the vehicle brake in accordance with the present invention will be accomplished without the arrangement of a first and a second annular seal 15, 16 with a supply reservoir connecting bore 17 located therebetween, and therefore even more mounting space will be saved in an axial direction. However, for safety reasons, two annular seals 15, 16 are preferably arranged with the supply-reservoir connecting bore 17 between them.

What is claimed is:

1. A hydraulic vehicle servo brake with a master cylinder comprising at least one stepped main-piston assembly, having an annular step connecting an enlarged main piston part to a tapered main piston part with an annular chamber provided at the annular step of the main piston, with a booster piston positively engaged with the main piston and being adapted to be acted upon by a brake pedal and by controlled auxiliary pressure in a control pressure chamber that is supplied by a brake valve governed by the brake pedal, with a first annular seal sealing the booster piston in relation to the control pressure chamber, with a second annular seal sealing the main piston in relation to the annular chamber, as well as with a valve disposed in the annular chamber which, when the brake pedal is not depressed, is opened due to the main piston being in an inactive position and connects the annular chamber with a supply reservoir and which will close upon depression of the brake pedal causing a slight advance movement of the main piston into an active position, wherein after closing of said valve, said annular chamber will be connected to a pressure chamber defined by of the main piston and a wheel-slip detecting brake control unit will shut off the connection to the annular chamber by way of valve means upon wheel slip detection and wherein an annular gap closed by two annular seals and connected to the supply reservoir by way of a port is arranged on the enlarged main piston part so that the annular chamber will be connected to the supply-reservoir port in the presence of a brake pedal travel in its active position which is sufficient for performing a panic stop that is not boosted by the controlled auxiliary pressure wherein the booster piston (12') and the tapered main piston part (12'') are united to form an integral piston (26) of constant diameter, on the integral piston the first and the second annular seals (15, 16) are provided at a close axial distance from one another, the supply reservoir being connected by a bore (17) and said port to said annular gap located between said two annular seals.

2. A vehicle brake as claimed in claim 1, wherein the second annular seal (16) is adjacent to the annular chamber (19).

3. A vehicle brake as claimed in claim 1, wherein the diameter of the booster piston (12') is equal to the diameter of the tapered main piston part (12'').

* * * * *